(12) United States Patent
Weston et al.

(10) Patent No.: US 12,703,298 B2
(45) Date of Patent: Aug. 11, 2026

(54) SYSTEMS AND METHODS FOR MONITORING AN OBJECT IN PROXIMITY TO A VEHICLE

(71) Applicant: Ford Global Technologies, LLC, Dearborn, MI (US)

(72) Inventors: Keith Weston, Canton, MI (US); Brendan Diamond, Naples, FL (US)

( * ) Notice: Subject to any disclaimer, the term of this patent is extended or adjusted under 35 U.S.C. 154(b) by 37 days.

(21) Appl. No.: 18/642,060

(22) Filed: Apr. 22, 2024

(65) Prior Publication Data

US 2025/0326355 A1 Oct. 23, 2025

(51) Int. Cl.
*B60Q 9/00* (2006.01)
*G01J 5/48* (2022.01)
(Continued)

(52) U.S. Cl.
CPC ................ *B60Q 9/00* (2013.01); *G01J 5/485* (2022.01); *G01J 2005/0077* (2013.01); *G06V 20/56* (2022.01)

(58) Field of Classification Search
CPC ............... H01S 5/0087; H01S 5/02212; H01S 5/02251; H01S 5/34333; H01S 5/4087; H01S 5/02345; H01S 5/22; H01S 5/4012; H01S 5/4031; H01S 5/0071; H01S 5/02326; H01S 5/2009; H01S 5/2201; H01S 5/0215; H01S 5/0217; H01S 5/02469; H01S 5/0287; H01S 5/02216; H01S 5/02255; H01S 5/1039; H01S 5/0203; H01S 5/0202; H01S 5/005; H01S 5/026; H01S 5/04254; H01S 5/04256; H01S 5/3202; H01S 5/4093; H01S 5/0085; H01S 5/02325;
(Continued)

(56) References Cited

U.S. PATENT DOCUMENTS

| | | | | |
|---|---|---|---|---|
| 10,065,562 | B2 * | 9/2018 | Bernstein ............... | G08G 1/166 |
| 2011/0248844 | A1 * | 10/2011 | Elias ....................... | E05B 77/28 701/36 |

(Continued)

FOREIGN PATENT DOCUMENTS

| | | |
|---|---|---|
| DE | 102022119408 A1 | 2/2023 |
| WO | 2023038428 A1 | 3/2023 |

OTHER PUBLICATIONS

Bob Tomes Ford, is the Ford F-150 Good for Camping?, https://www.bobtomesford.com/is-the-ford-f-150-good-for-camping/, May 24, 2021, pp. 1-3.

(Continued)

*Primary Examiner* — Daniel Previl
(74) *Attorney, Agent, or Firm* — Frank Lollo; Eversheds Sutherland (US) LLP

(57) ABSTRACT

A vehicle including a sensor unit and a processor is disclosed. The sensor unit may be configured to capture sensor inputs associated with an object to be monitored in proximity to the vehicle. The processor may be configured to obtain user inputs indicating the object to be monitored, and obtain the sensor inputs from the sensor unit responsive to obtaining the user inputs. The processor may further monitor an object state based on the sensor inputs, and determine a change in the object state based on the monitoring. The process may output an alert notification responsive to determining the change in the object state.

20 Claims, 5 Drawing Sheets

(51) Int. Cl.
*G01J 5/00* (2022.01)
*G06V 20/56* (2022.01)

(58) Field of Classification Search
CPC ............. H01S 5/02375; H01S 2304/04; H01S 5/02257; H01S 5/34346; H01S 5/4056; H01S 5/320275; H01S 5/0225; H01S 5/0234; H01S 5/028; H01S 5/04252; H01S 5/062; H01S 5/2206; H01S 5/3402; H01S 5/343; H01S 2304/02; H01S 5/0428; H01S 5/3213; H01S 5/32308; H01S 5/3235; H01S 5/3401; H01S 5/3432; H01S 5/32025; H01S 5/02438; H01S 5/3063; H01S 5/02208; H01S 5/0237; H01S 5/320225; H04B 10/116; H04B 10/114; H04B 10/1141; H04B 10/502; H04B 10/5057; H04B 10/524; H04B 10/564; H04B 10/572; H04B 10/60; H04B 10/503; H04B 10/40; H04B 10/506; H04B 10/11; H10H 20/042; H10H 20/825; H10H 20/8512; H10H 20/8142; H10H 20/821; H10H 20/84; H10H 20/851; H10H 20/8506; H10H 20/8514; H10H 20/8515; G01S 17/10; G01S 17/89; G01S 17/86; G01S 17/931; G01S 7/4817; G01S 7/487; G01S 7/4814; G01S 7/4815; G01S 13/04; G01S 15/04; G01S 15/06; G01S 15/87; G01S 15/88; G01S 17/88; G01S 7/417; G01S 7/4802; G01S 7/539; G01S 13/876; G01S 15/42; G01S 17/04; G01S 17/36; G01S 17/894; G01S 2013/9323; G01S 7/025; G01S 7/4811; G01S 7/4816; G01S 7/484; G01S 7/4863; G01S 7/4914; F21V 29/70; F21V 9/32; F21V 29/502; F21V 7/30; F21V 9/30; F21V 9/38; G02B 27/0916; G02B 19/0057; G02B 26/0833; G02B 27/0977; G02B 26/105; G02B 27/0955; G02B 27/095; G02B 2027/014; G02B 2027/0187; G02B 26/103; G02B 27/01; F21K 9/64; B60Q 1/085; B60Q 1/143; B60Q 2300/41; B60Q 2300/42; F21Y 2113/30; F21Y 2115/30; F21Y 2115/10; F21Y 2113/13; B60N 2/0025; B60N 2/0028; B60N 2/0035; B60N 2/267; B60N 2210/12; B60N 2210/26; B60N 2210/42; B60N 2210/50; B60N 2220/20; B60N 2230/20; B60N 2230/30; B60N 2/0022; B60N 2/0023; B60N 2/0026; B60N 2/0029; B60N 2/0031; B60N 2210/18; B60N 2210/24; B60N 2/0272; B60N 2220/30; B60N 2/0024; B60N 2/0032; B60N 2/0033; B60N 2/015; B60N 2/02246; B60N 2/0248; B60N 2/0252; B60N 2/0268; B60N 2/0273; B60N 2/0276; B60N 2/0278; B60N 2/067; B60N 2/266; B60N 2/268; B60N 2/2806; B60N 2/2863; B60N 2/66; B60N 2/829; B60N 2/853; B60N 2/888; B60N 2210/20; B60N 2210/44; B60N 2210/46; B60N 2210/48; B60N 2220/10; B60N 2210/30; F21L 4/005; B60R 21/013; B60R 21/01516; B60R 21/0152; B60R 21/0153; B60R 21/01534; B60R 21/01536; B60R 21/01542; B60R 2021/23153; B60R 21/0136; B60R 16/037; B60R 2001/1223; B60R 2001/1253; B60R 2021/0027; B60R 2021/01088; B60R 2021/01184; B60R 2021/01315; B60R 2021/26094; B60R 2021/2765; B60R 2022/208; B60R 2022/288; B60R 2022/4685; B60R 2022/4825; B60R 21/132; B60R 21/0134; B60R 21/015; B60R 21/01532; B60R 21/01538; B60R 21/01544; B60R 21/01546; B60R 21/01548; B60R 21/01552; B60R 21/01554; B60R 21/203; B60R 21/21656; B60R 21/276; B60R 22/20; B60R 22/201; B60R 25/25; B60R 25/252; B60R 25/255; B60R 25/257; B60R 2021/0004; B60R 2021/23107; B60R 2021/23161; B60R 2021/23169; B60R 2021/23519; B60R 2021/23523; B60R 2021/23557; B60R 2021/2358; B60R 2021/2359; B60R 21/20; B60R 21/213; B60R 21/232; B60R 21/233; B60R 21/235; B60R 21/30; G06V 20/00; G06V 20/59; G06V 40/10; G07C 5/008; G07C 5/0808; G07C 5/085; A61L 2/10; A61L 9/20; B60C 11/24; B60C 19/00; B60C 23/0408; B60C 23/005; B60C 23/20; B60C 23/041; B60C 23/0411; B60C 23/0449; B60C 23/126; B60C 23/131; E05F 15/43; E05F 15/431; E05F 2015/433; E05Y 2900/516; E05Y 2900/542; E05Y 2900/55; G06F 3/0219; G06F 3/0233; G06F 3/0237; G06F 3/0238; G06K 19/0717; G06K 7/10178; G08B 13/1427; G08B 13/248; G08B 21/0286; G08B 29/181; G10K 2210/1282; G10K 2210/3219; G08G 1/017; G08G 1/164; H01Q 1/3291; H01Q 1/2241; H04N 25/773; H10F 39/182; H10F 39/184; H10F 39/191; B60J 10/00; H04J 14/0278; H05B 47/105; H05B 47/155; H05B 47/165; H05B 47/175; H10W 90/00
USPC ........... 340/425.5, 438, 427, 995.19, 995.16, 340/995.12, 995.25, 994, 439, 457, 340/539.13, 539.23, 539.21–539.22
See application file for complete search history.

(56) References Cited

U.S. PATENT DOCUMENTS

| | | | | |
|---|---|---|---|---|
| 2016/0110618 | A1* | 4/2016 | Oba | G06V 20/597 348/148 |
| 2018/0354555 | A1* | 12/2018 | Sheng | B62D 15/0255 |
| 2019/0279447 | A1 | 9/2019 | Ricci | |
| 2020/0294401 | A1 | 9/2020 | Kerecsen | |
| 2021/0116907 | A1* | 4/2021 | Altman | G05D 1/223 |
| 2021/0287548 | A1* | 9/2021 | Lai | B60R 1/025 |
| 2021/0300306 | A1* | 9/2021 | Costin | B60T 7/22 |
| 2021/0316662 | A1* | 10/2021 | Matajira | G06V 10/44 |
| 2023/0166608 | A1* | 6/2023 | Mackenzie | B60L 53/12 |
| 2023/0419836 | A1* | 12/2023 | Sheikh | G08G 1/161 |
| 2024/0101128 | A1* | 3/2024 | Bradley | B60W 50/0097 |

(56) References Cited

OTHER PUBLICATIONS

Yanase Kazuhiro, etc., Vehicle Interior/Exterior Monitoring Solution for Safe Transportation of People and Goods, NEC Technical Journal, https://www.nec.com/en/global/techrep/journal/g20/n01/200113.html, 2020, pp. 1-16.

* cited by examiner

SYSTEMS AND METHODS FOR MONITORING AN OBJECT IN PROXIMITY TO A VEHICLE

FIELD

The present disclosure relates to systems and methods for monitoring an object in proximity to a vehicle.

BACKGROUND

When camping, people typically set up the camp using various components, e.g., a camper, a generator, a grill, wood for bonfire, a tent, and/or the like, near their vehicle. Similarly when a user works on a worksite, e.g., a construction site, various work components/units, such as trolleys, cranes, machines, etc., may be disposed and operate near vehicles so that the user may conveniently and efficiently work at the worksite.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
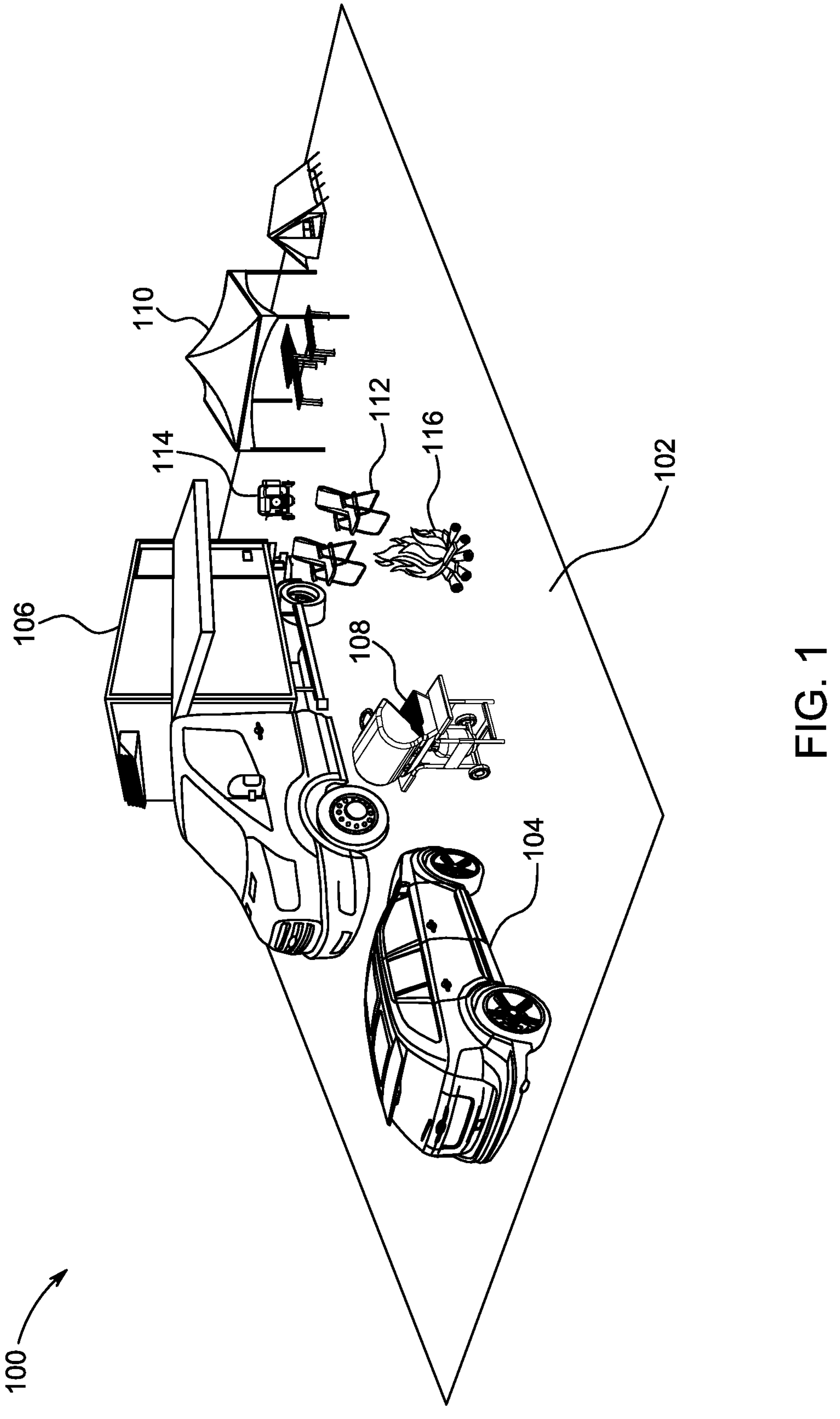
FIG. 1 depicts an environment in which techniques and structures for providing the systems and methods disclosed herein may be implemented.

The present disclosure describes a vehicle that may be configured to monitor a state of an object in proximity to the vehicle and output an alert notification when the object state changes. The vehicle may include a sensor unit that may be configured to capture sensor units associated with the object to be monitored. In some aspects, the sensor unit may include one or more vehicle interior or exterior cameras, radio detection and ranging (radar) sensors, light detection and ranging (lidar) sensors, microphones, thermal cameras, etc. Further, the sensor inputs captured by the sensor unit may include object' RGB images, thermal images, noise or sound level emanating from the object, and/or the like. The vehicle may monitor the object based on the sensor inputs and may output the alert notification when the object state changes.

In some aspects, when the user desires the vehicle to monitor the object, the user may transmit user inputs to the vehicle indicating the object to be monitored in the vehicle's vicinity, via a user device or a vehicle Human-Machine Interface (HMI). The user may further ensure that the object is in a field of view (FOV) of the sensor unit. In alternative aspects, the vehicle may autonomously move close to the object to be monitored, so that the object may come in the sensor unit's FOV.

Responsive to the user providing the user inputs to the vehicle, the vehicle may commence to obtain the sensor inputs from the sensor unit. The vehicle may further determine an initial object state based on the sensor inputs. The vehicle may then continuously monitor a real-time object state based on the sensor inputs and compare the real-time object state with the initial object state. The vehicle may output the alert notification when the real-time object state becomes different from the initial object state. For example, the vehicle may output the alert notification when an initial object location or structure changes, the object starts to emanate more or less heat and/or sound than its initial state, and/or the like. The alert notification may indicate to the user that the object may have developed a fault, and hence remedial actions may be needed.

In additional aspects, the user may define an "error state" associated with the object to be monitored, and the vehicle may output the alert notification when the object state becomes equivalent to the error state. The vehicle may further monitor weather conditions in proximity to the vehicle and may output the alert notification when the weather conditions change. In further aspects, if the object to be monitored may be getting powered by the vehicle (e.g., via a vehicle's power source or battery), the vehicle may automatically disable an energy transfer to the object when the vehicle determines that the object state may have changed.

The present disclosure discloses a vehicle that is configured to monitor one or more objects in proximity to the vehicle. The vehicle provides timely alerts to the user when the object state changes, so that the user may perform remedial actions, thereby preventing chances of any adverse situation. The vehicle enables the user to conveniently monitor temporary structures, e.g., at a campsite or a worksite, which are typically more prone to changes in structure, thereby enabling the user to efficiently work at the worksite or peacefully enjoy the camping experience.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a geographical area 102 where a vehicle 104 may be located. The geographical area 102 may be a camping site (as shown in FIG. 1), a worksite, a user house, a user office space, and/or the like. The example depiction of the geographical area 102 as a camping site shown in FIG. 1 should not be construed as limiting.

The geographical area 102 may include a plurality of devices/units/objects (which may be temporary structures) including, but not limited to, a camper 106, a grill 108, a tent 110, one or more chairs 112, a generator 114, a bonfire 116 (or wood for bonfire), a portable restroom (not shown), and/or the like. In a similar manner, when the geographical area 102 is a worksite, the devices/units/objects may be cranes, trolleys, trowel systems, machines, and/or the like.

The vehicle 104 may take the form of any passenger or commercial vehicle such as a car, a work vehicle, a crossover vehicle, a truck, a van, a minivan, a taxi, a bus, etc. The vehicle 104 may be a manually driven vehicle, or may be configured to operate in a partially/fully autonomous mode, and may include any powertrain such as a gasoline engine, one or more electrically-actuated motor(s), a hybrid system, etc.

The vehicle 104 may be configured to monitor a state of one or more objects or devices/units that may be located in the geographical area 102 (e.g., when a vehicle user may or may not be present in proximity to the vehicle 104) and output an alert notification when the object state changes. For example, the vehicle 104 may monitor a tent state (or state of one or more tie-downs connecting the tent 110 to the ground) and may output an alert notification when the tie-down is detached from the ground or gets loose.

In some aspects, to cause the vehicle 104 to monitor an object state, the user (not shown) may first transmit user inputs to the vehicle 104 indicating one or more objects that are required to be monitored in the geographical area 102. For example, the user may indicate to the vehicle 104 that the tent 110 and the generator 114 (or any other object in the geographical area 102) are required to be monitored. In this case, the user may additionally ensure that the tent 110 and the generator 114 are in a field of view (FOV) of a vehicle's sensor unit (shown as vehicle sensory system 232 in FIG. 2). For example, the user may drive and park the vehicle 104 at an optimal location in the geographical area 102 where the tent 110 and the generator 114 are in the sensor unit's FOV. Alternatively, the vehicle 104 may autonomously move to a location in the geographical area 102 where the tent 110 and the generator 114 are in the sensor unit's FOV, responsive to receiving the user inputs.

In some aspects, the user may transmit the user inputs to the vehicle 104 via a user device (shown as user device 204 in FIG. 2), a vehicle Human-Machine Interface (HMI) or infotainment system (shown as infotainment system 238 in FIG. 2), and/or the like. Further, in one exemplary aspect, the sensor unit may include a vehicle exterior camera (e.g., an RGB camera), a radio detection and ranging (radar) sensor, a light detection and ranging (lidar) sensor, and/or the like. In this case, responsive to receiving the user inputs and responsive to the vehicle 104 being stationed in the sensor unit's FOV, the vehicle 104 may begin to obtain "sensor inputs" or object images captured by the sensor unit. For example, the vehicle 104 may obtain one or more tent images and generator images from the sensor unit. In some aspects, the vehicle 104 may obtain the sensor inputs for a predefined time duration input by the user. In an exemplary aspect, the predefined time duration may be associated with a time duration when the user may be moving away from the geographical area 102 (and hence may not be available to manually inspect the tent 110 and the generator 114), or a time duration for which the user may be in the geographical area 102 but may not be able to manually inspect the tent 110 and the generator 114 (e.g., when the user may be inside the camper 106 and/or sleeping), etc.

The vehicle 104 may analyze the sensor inputs and identify an "initial object state" (e.g., an "initial tent state" and an "initial generator state") when the vehicle 104 begins to obtain the sensor inputs. For example, the vehicle 104 may identify that the tent 110 is optimally secured to the ground, and the generator 114 is located at a specific location relative to the camper 106 (and functioning optimally, e.g., with no occurrence of smoke or any falling components), when the vehicle 104 begins to obtain the sensor inputs.

The vehicle 104 may then continue to obtain the sensor inputs and monitor a real-time object state by continuously analyzing the sensor inputs. In some aspects, the vehicle 104 may monitor the real-time object state by using Artificial Intelligence/Machine Learning (AI/ML) based image processing algorithms that may compare the initial tent and generator state/images with the real-time tent and generator state/images. In this case, the vehicle 104 may continue to obtain the real-time tent images and generator images from the sensor unit and compare them with the initial tent state and the initial generator state by using the AI/ML based image processing algorithms. The vehicle 104 may output an alert notification when the vehicle 104 determines that the real-time object state (e.g., the real-time tent state and/or generator state) has changed relative to the initial object state based on the monitoring of the sensor inputs. For example, the vehicle 104 may output the alert notification when the tie-down may get detached from the ground and/or when the generator 114 is moved relative to its initial position or a generator component gets broken and falls off. In some aspects, the vehicle 104 may output the alert notification via the user device, the information system, a vehicle speaker/sound exciters (e.g., by outputting an audible alert/alarm), vehicle exterior and/or interior lights (e.g., by flashing lights), and/or the like.

The alert notification may indicate to the user that the tent state and/or the generator state has changed, and hence remedial actions may be needed to restore the object state and/or repair the object (e.g., the tent 110 and/or the generator 114). In this manner, the vehicle 104 assists the user to know that the object state may have been altered or the object may have gone to a suboptimal state in a timely manner, thereby reducing chances of any adverse situation.

In additional aspects, the sensor unit may include one or more thermal cameras that may be configured to capture object's thermal images. In this case, the vehicle 104 may determine a heat signature or a thermal profile associated with the object based on the object's thermal images. The object thermal profile may be associated with an amount of heat that the object may be emanating. For example, in this case, the vehicle 104 may determine the thermal profile of the generator 114 based on the generator's thermal images captured by the thermal cameras. The vehicle 104 may further monitor the generator's thermal profile based on the real-time thermal images captured by the thermal cameras and may output the alert notification when the vehicle 104 determines that the generator's thermal profile may have changed. For example, the vehicle 104 may output the alert notification when the generator 114 starts to emanate more heat than usual, indicating that the generator 114 may have developed a fault.

The vehicle 104 may be further configured to monitor weather conditions in proximity to the vehicle 104 and output the alert notification when the weather conditions change significantly. For example, the vehicle 104 may output the alert notification when there may be an earthquake in the geographical area 102, onset of rain, snow, hailstorm, high-speed winds, etc. In some aspects, the vehicle may monitor the weather conditions based on inputs obtained from vehicle's ambient weather monitoring sensors (that may be part of the sensor unit), or inputs obtained from one or more external weather related servers/entities.

In further aspects, the vehicle 104 may monitor sound or noise level emanating from the object (e.g., the generator 114) via a vehicle microphone (that may be part of the sensor unit) and may output the alert notification when the real-time sound or noise level changes substantially (e.g., more than a predefined threshold).

In additional aspects, the user may provide inputs to the vehicle 104 indicating an "error state" associated with the object, and the vehicle 104 may output the alert notification when the vehicle 104 determines that the object may have reached or gone to the error state. For example, when the geographical area 102 may be a construction worksite, the user may define that a machine or crane (which may be the object that is being monitored by the vehicle 104) may be in an error state when it is titled by more than a predefined angle relative to the ground, or a heavy object may be in an error state when it is hung or hovered over people at the worksite, or a worksite floor may be in an error state when the floor is wet, and/or the like. In this case, the vehicle 104 may monitor the real-time object state by using the inputs obtained from the sensor unit as described above and may output the alert notification when the vehicle 104 determines that the object state may have become equivalent to the error state.

When the geographical area 102 may be the user house or office space, the vehicle 104 may monitor a house's exterior portion (or office's exterior portion) that may be in the sensor unit's FOV and may output the alert notification when an exterior portion state changes. For example, in this case, the vehicle 104 may output the alert notification when an animal, another vehicle, etc. enters the exterior portion, or one or more objects already placed in the exterior portion (e.g., trash cans, etc.) are removed from the exterior portion.

Further vehicle details are described below in conjunction with FIG. 2.

The vehicle 104 and/or the vehicle user implement and/or perform operations, as described here in the present disclosure, in accordance with the owner manual and safety guidelines. In addition, any action taken by the user based on the notifications provided by the vehicle 104 should comply with all the rules specific to the location and operation of the vehicle 104 (e.g., Federal, state, country, city, etc.). The notifications, as provided by the vehicle 104, should be treated as suggestions and only followed according to any rules specific to the location and operation of the vehicle 104.

Figure 2:
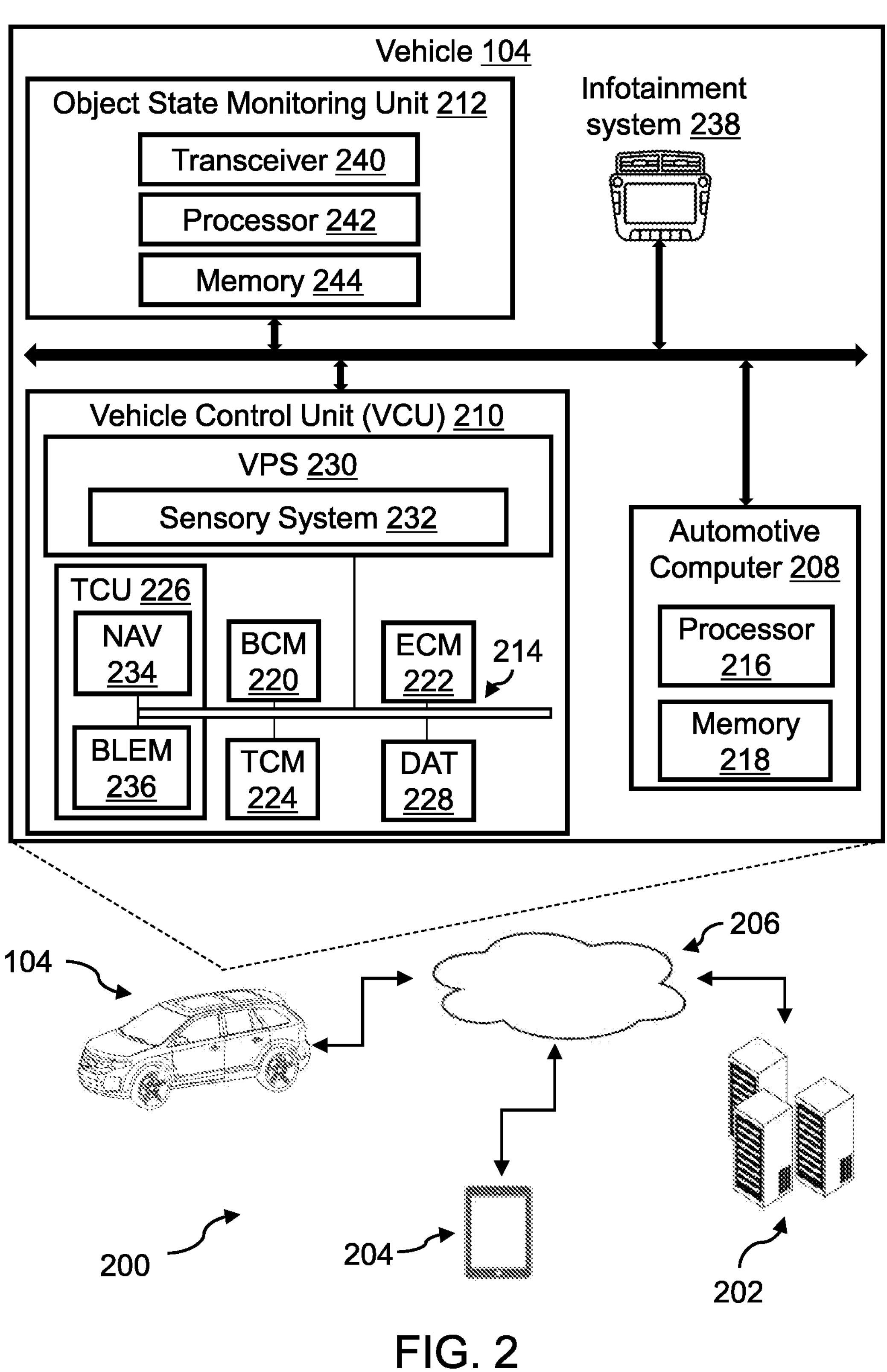
FIG. 2 depicts a block diagram of a system to monitor an object in accordance with the present disclosure.
Figure 3:
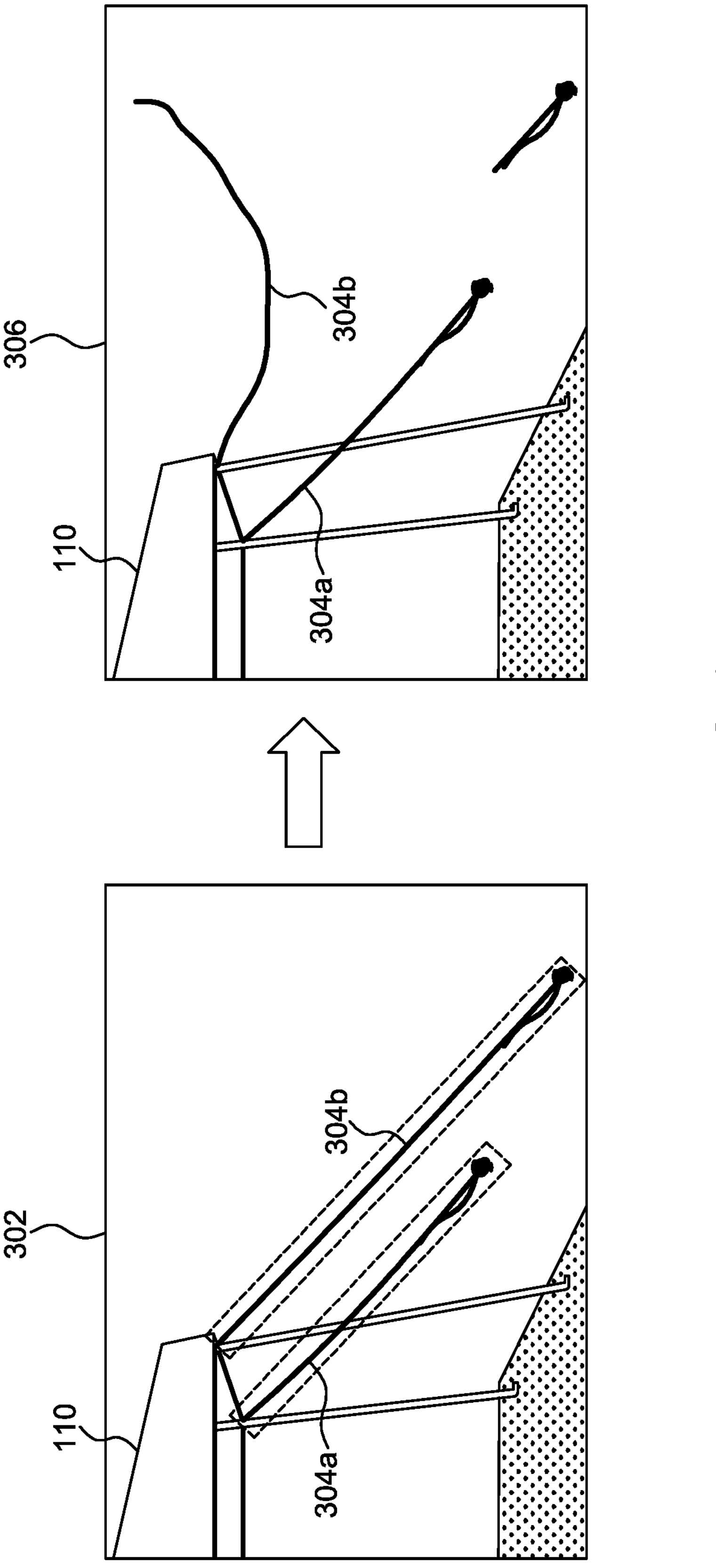
FIG. 3 depicts one or more example views of a monitored object in accordance with the present disclosure.

FIG. 2 depicts a block diagram of a system 200 to monitor an object in accordance with the present disclosure. While describing FIG. 2, references will be made to FIGS. 3 and 4.

The system 200 may include the vehicle 104, one or more servers 202 (or a server 202), and a user device 204 communicatively coupled with each other via one or more networks 206. The server 202 may be part of a cloud-based computing infrastructure and may be associated with and/or include a Telematics Service Delivery Network (SDN) that provides digital data services to the vehicle 104 and other vehicles (not shown in FIG. 2) that may be part of a vehicle fleet. In further aspects, the server 202 may provide Artificial Intelligence/Machine Learning (AI/ML) based image processing algorithms to the vehicle 104, which may enable the vehicle 104 to analyze the object images captured by one or more vehicle cameras, radar sensors, lidar sensors, and/or the like, and determine whether the object state has changed based on the image analysis. The server 202 may provide the AI/ML based image processing algorithms to the vehicle 104 at a predefined frequency, or when the vehicle 104 transmits a request to the server 202 to obtain such algorithms.

In further aspects, the server 202 may be associated with authorities such as Police, a worksite manager, a campground manager, and/or the like. In additional aspects, the server 202 may be associated with a weather monitoring firm/entity and may provide information associated with weather conditions in the geographical area 102 to the vehicle 104 at a predefined frequency.

The user device 204 may be associated with the vehicle user and may be, for example, a mobile phone, a computer, a laptop, a tablet, a smart wearable device, or any other device with communication capabilities.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 104 may include a plurality of units including, but not limited to, an automotive computer 208, a Vehicle Control Unit (VCU) 210, and an object state monitoring unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 104, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing an object state monitoring program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 104 systems, connected servers (e.g., the server(s) 202), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or "sensor unit"). The vehicle sensory system 232 may include one or more vehicle sensors including, but not limited to, a radio detection and ranging (radar) sensor configured for detection and localization of objects inside and outside the vehicle 104 using radio waves, sitting area buckle sensors, sitting area sensors, a light detecting and ranging (lidar) sensor, door sensors, proximity sensors, temperature sensors, wheel sensors, ambient weather monitoring sensors, vehicle internal and external cameras, one or more rain sensors, capacitive moisture sensors, one or more microphones, thermal cameras, etc. In some aspects, the vehicle sensory system 232 may be configured to capture sensor inputs associated with one or more objects (e.g., the tent 110, the generator 114, the bonfire 116, and/or the like) to be monitored in proximity to the vehicle 104 and transmit the sensor inputs to the automotive computer 208 and/or the unit 212.

As an example, the vehicle internal and external cameras, the radar sensors, and/or the lidar sensors may capture object images and transmit the object images to the automotive computer 208 and/or the unit 212. In this case, the sensor inputs may include the object images. As another example, the thermal cameras may capture object's thermal images and transmit the thermal images to the automotive computer 208 and/or the unit 212. In this case, the sensor inputs may include the thermal images. As yet another example, the microphones may capture noise level or sound signals emanating from the object and transmit the noise level (or information associated with the noise level) to the automotive computer 208 and/or the unit 212. In this case, the sensor inputs may include the information associated with the noise level.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 104 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 104 and other systems (e.g., a key fob), computers, and modules. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), headlights, audio system(s), speakers, wipers, door locks and access control, and various comfort controls. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may be further configured to receive user instructions/inputs via the touchscreen interface portion, and/or display notifications, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 104, may include a transceiver 240, a processor 242, and a computer-readable memory 244.

The transceiver 240 may be configured to receive information/inputs from one or more external devices or systems, e.g., the user device 204, the server(s) 202, and/or the like via the network 206. For example, the transceiver 240 may receive the AI/ML based image processing algorithms from the server(s) 202 via the network 206. Further, the transceiver 240 may transmit notifications (e.g., alert/alarm signals) to the external devices or systems. In addition, the transceiver 240 may be configured to receive information/inputs from vehicle 104 components such as the infotainment system 238, the vehicle sensory system 232, and/or the like. Further, the transceiver 240 may transmit notifications (e.g., alert/alarm/command signals) to the vehicle 104 components such as the infotainment system 238, the BCM 220, etc.

The processor 242 and the memory 244 may be the same as or similar to the processor 216 and the memory 218, respectively. In some aspects, the processor 242 may be an AI/ML based processor that may utilize the memory 244 to store programs in code and/or to store data for performing aspects in accordance with the disclosure. The memory 244 may be a non-transitory computer-readable medium or memory storing the object state monitoring program code. In some aspects, the memory 244 may additionally store the AI/ML based image processing algorithms that the vehicle 104 may obtain from the server(s) 202.

In operation, when the vehicle user desires the vehicle 104 to monitor the object state(s) of one or more objects (e.g., the tent 110, the tie-down, the generator 114, etc.) located in proximity to the vehicle 104, the user may transmit user inputs to the transceiver 240 via the user device 204, the infotainment system 238, and/or the like. The user inputs may indicate the object(s) to be monitored. Stated another way, the user inputs may indicate to the vehicle 104 the specific objects in the geographical area 102 that the user desires the vehicle 104 to monitor.

In an exemplary aspect, the user may transmit the user inputs to the transceiver 240 by "selecting" the objects to be monitored on the user device 204 or the infotainment system 238, which may be executing an Augmented Reality (AR) application ("app") that may enable the user to select the object(s) to be monitored. For example, as shown in a view 302 of FIG. 3, the user may select tie-downs 304*a*, 304*b* as the objects to be monitored in the geographical area 102 (e.g., by "selecting" the tie-downs 304*a*, 304*b* on the AR app being executed on the user device 204 or the infotainment system 238). In some aspects, the user inputs may additionally include information associated with a time duration (e.g., 2 hours, 4 hours, 8 hours, etc.) for which the user desires the vehicle 104 to monitor the selected object(s). In other aspects, the user inputs may not include the information associated with the time duration described above. The transceiver 240 may transmit the user inputs obtained from the user to the processor 242.

The processor 242 may obtain the user inputs from the transceiver 240. Responsive to obtaining the user inputs, the processor 242 may obtain the sensor inputs from the vehicle sensory system 232. The processor 242 may then determine a field of view (FOV) associated with one or more sensors (e.g., cameras, radar sensors, lidar sensors, and/or the like) included in the vehicle sensory system 232 based on the obtained sensor inputs. The processor 242 may further check/determine whether the objects that the user desires to monitor (e.g., the tie-downs 304*a*, 304*b*) are in the sensor unit's FOV. The processor 242 may transmit a command signal to the VCU 210 and cause an autonomous vehicle movement such that the objects to be monitored come within the sensor unit's FOV, when the processor 242 determines that the objects are not in the sensor unit's FOV. In other aspects, prior to or after transmitting the user inputs to the vehicle 104, the user may drive the vehicle 104 to such a location in the geographical area 102 where the objects to be monitored are in the sensor unit's FOV.

Responsive to having the objects in the sensor unit's FOV, the processor 242 may determine an "initial object state" based on the sensor inputs, when the processor 242 begins to obtain the sensor inputs responsive to obtaining the user inputs. In one exemplary aspect, the initial object state may be an initial object location and/or an initial object structure that the processor 242 may determine based on the object images obtained from the vehicle camera, the radar sensors, the lidar sensors, and/or the like. For example, the processor 242 may determine that the tie-downs 304*a*, 304*b* are securely tied to the ground in proximity to the tent 110 as the "initial object state" of the tie-downs 304*a*, 304*b*.

In a second exemplary aspect, the initial object state may be an initial object thermal profile associated with the object to be monitored that the processor 242 may determine based on the object's thermal images obtained from the thermal cameras. In some aspects, the initial object thermal profile may be associated with an amount of heat that may be generated by or emanating from the object. For example, when the object to be monitored is the generator 114, the processor 242 may determine the initial object thermal profile or the amount of heat emanating from the generator 114 based on the generator's thermal images.

In a third exemplary aspect, the initial object state may be an initial noise level associated with the object to be monitored that the processor 242 may determine based on the information associated with the noise level obtained from the vehicle microphones. For example, when the object to be monitored is the generator 114, the processor 242 may determine the initial noise level or sound level generated by the generator 114 based on the inputs obtained from the vehicle microphones.

Responsive to determining the initial object state as described above, the processor 242 may monitor a real-time object state based on the sensor inputs that the processor 242 may continuously obtain from the vehicle sensory system 232 (e.g., for the time duration indicated by the user in the user inputs). For example, the processor 242 may monitor the real-time tie-down state or the real-time generator state based on the sensor inputs (e.g., object images, thermal images, noise level, etc.) obtained from the vehicle sensory system 232. The processor 242 may further continuously compare the real-time object state with the initial object state. In some aspects, the processor 242 may compare the real-time object state with the initial object state by using the AI/ML based image processing algorithms that the vehicle 104 may obtain from the server 202.

The processor 242 may output an alert notification when the processor 242 determines that the real-time object state is changed relative to the initial object state. In one exemplary aspect, the processor 242 may determine the change in the object state and output the alert notification when the processor 242 determines a change in the initial object location and/or structure (determined based on the object images). For example, the processor 242 may determine a change in the initial tie-down state and output the alert notification when one or both the tie-downs 304*a*, 304*b* may get detached from the ground (as shown in a view 306 of FIG. 3, where the tie-down 304*b* is detached from the ground).

In a similar manner, the processor 242 may output the alert notification when the camper 106, the portable rest room, and/or other objects located in the geographical area 102 change their location or structure (if the objects are indicated by the user as the objects to monitor). Similarly, the processor 242 may output the alert notification when a fire size associated with the bonfire 116 expands or increases.

In a second exemplary aspect, the processor 242 may determine the change in the object state and output the alert notification when the processor 242 determines a change in the initial object thermal profile based on the object's thermal images. For example, the processor 242 may determine a change in the initial object thermal profile and output the alert notification when the generator 114 (or any other electric tool, machine, etc.) starts to generate and emanate more heat than the initial generator thermal profile.

In a third exemplary aspect, the processor 242 may determine the change in the object state and output the alert notification when the processor 242 determines a change in the initial noise level based on the monitoring of the noise level or inputs obtained from the vehicle microphone. For example, the processor 242 may determine a change in the initial noise level and output the alert notification when the generator 114 (or any other electric tool, machine, etc.) starts to generate more noise than the initial generator noise level or sound level (or stops making any noise, indicating that the generator 114 may have stopped working).

In some aspects, the processor 242 may output the alert notification described above via the user device 204, the infotainment system 238, a vehicle speaker or sound exciter (e.g., by outputting an audible alarm), one or more vehicle interior and/or exterior lights (e.g., by flashing the lights), and/or the like. The processor 242 may also transmit, via the transceiver 240, the alert notification to the server 202 so that the authorities may be alerted. The processor 242 may output the alert notification so that the user and/or the authorities may perform timely remedial actions and prevent any adverse situation.

In further aspects, the processor 242 may obtain information associated with weather conditions in the geographical area 102 from the server 202 and monitor the information associated with weather conditions. The processor 242 may output the alert notification described above when the processor 242 determines a change in weather conditions in the geographical area 102 based on the monitoring of the information associated with weather conditions. For example, the processor 242 may output the alert notification when the processor 242 detects an earthquake, an onset of rain, snow, high-speed winds, and/or the like.

The vehicle 104, as described above, provides a plurality of advantages to the user. For example, the user may cause the vehicle 104 to monitor the geographical area 102 when the user may be camping overnight. As another example, if the user may be sleeping in the tent 110, the user may be informed by the vehicle 104 if one or more tie downs 304*a*, 304*b* become disconnected, so that the user may perform timely remedial actions. The user may similarly use the vehicle 104 to monitor a campsite or a worksite when the user may be departing the site and may want to know if the site's state has changed when the user returns. In this case, the vehicle 104 may record the specific geolocation or GPS coordinates of the area where the vehicle 104 is parked before the user departs. The vehicle 104 may further record an initial state of the site before the user departs. Thereafter, when the user returns to the site, the vehicle 104 may prompt the user to park the vehicle 104 at the same geolocation or GPS coordinates so that the vehicle 104 may view the site from the same FOV as before. The vehicle 104 may further determine the real-time state of the site and compare it with the initial state that the vehicle 104 recorded before the user's departure. The vehicle 104 may output the alert notification in a similar manner as described above, when the real-time state is different from the initial state.

In additional aspects, as part of the user inputs described above, the user may provide information associated with an "error state" of the object that is being monitored to the vehicle 104/processor 242. For example, when the geographical area 102 is associated with a construction work site.

In this case, the processor 242 may monitor the object state in the similar manner as described above by using the sensor inputs obtained from the vehicle sensory system 232 and may output the alert notification when the object state becomes equivalent to or changes to the error state. For example, the processor 242 may output the alert notification when the crane angle becomes greater than the predefined angle, when the object to be monitored is the crane. Similarly, the processor 242 may output the alert notification when the worksite floor becomes wet.

The processor 242 may additionally output the alert notification if the object to be monitored moves away from the vehicle sensory system's FOV (e.g., due to object movement or vehicle movement) and/or the vehicle sensory system's FOV becomes obstructed. In this case, responsive to hearing/viewing the alert notification, the user may perform remedial actions to make the object come within the vehicle sensory system's FOV.

In further aspects, if the object to be monitored (e.g., a tool or a machine) is getting powered by a vehicle's power source or a vehicle battery (not shown), the processor 242 may disable an energy transfer to the object from the vehicle's power source, responsive to determining that the object is being powered by the vehicle's power source and the object state has changed.

Figure 4:
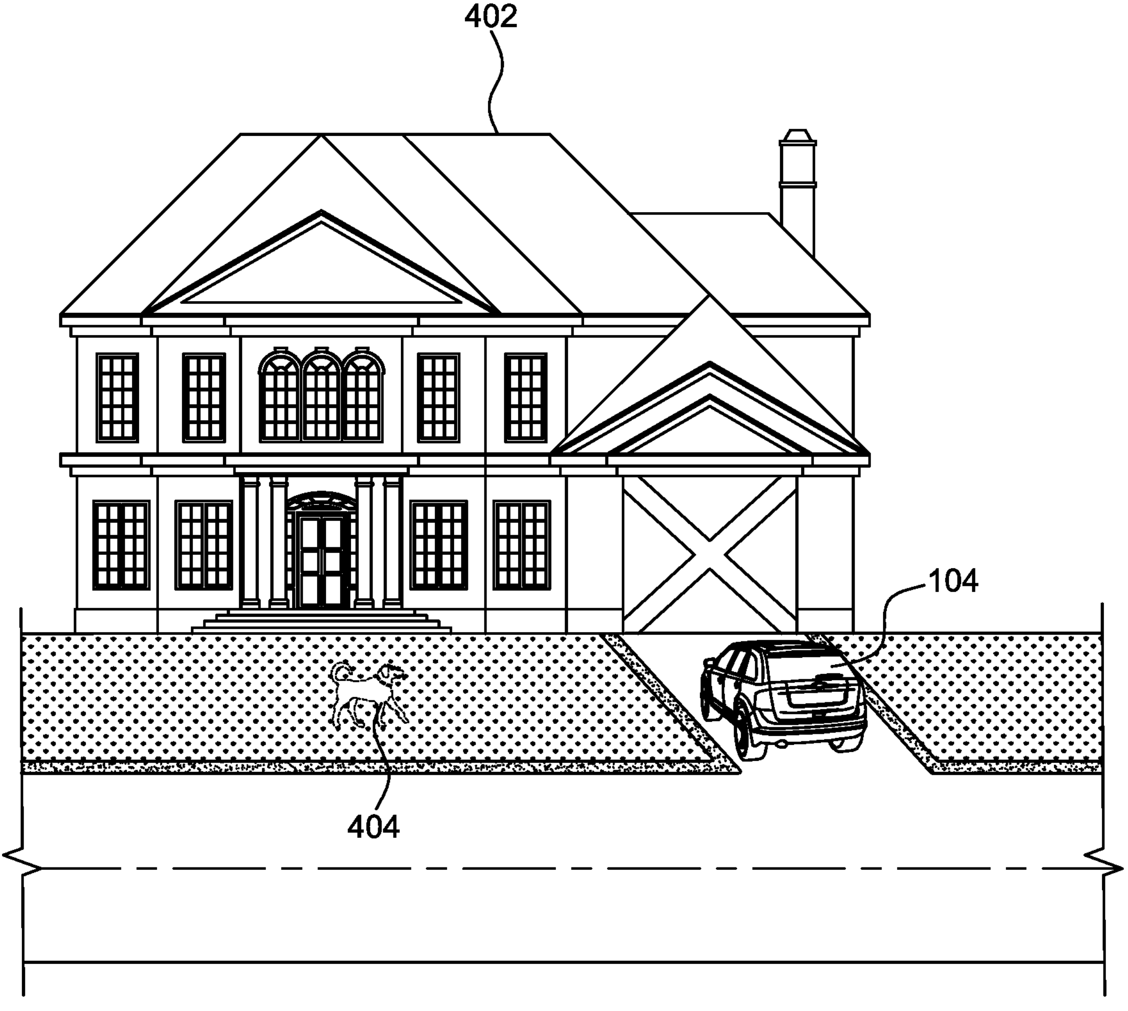
FIG. 4 depicts a view a house being monitored by a vehicle in accordance with the present disclosure.

The present disclosure is not limited to monitoring only the campsite or the worksite described above. In additional aspects, the vehicle 104 may similarly monitor an exterior portion of a house 402, as shown in FIG. 4. In this case, the vehicle 104 may record an initial state of a house exterior portion (e.g., an initial position of a trash can, flower pots, etc.) and may continuously determine/monitor a real-time state of the house exterior portion. The vehicle 104 may output the alert notification when the real-time state does not match with the initial state. For example, the vehicle 104 may output the alert notification when a trash can may be missing or its location may be changed, or when an animal 404 enters the house garden, or an unknown person or vehicle visits the house exterior portion, and/or the like.

In this case, key off loads for overnight or sustained key off monitoring may be managed by schedule, or "as-required" vehicle engine operation may be performed on cycles. For example, the user may pick/select the least disruptive times to start the vehicle engine, so that the vehicle battery is optimally charged for the monitoring operation described above, while at the same time ensuring that other people are not disturbed.

Figure 5:
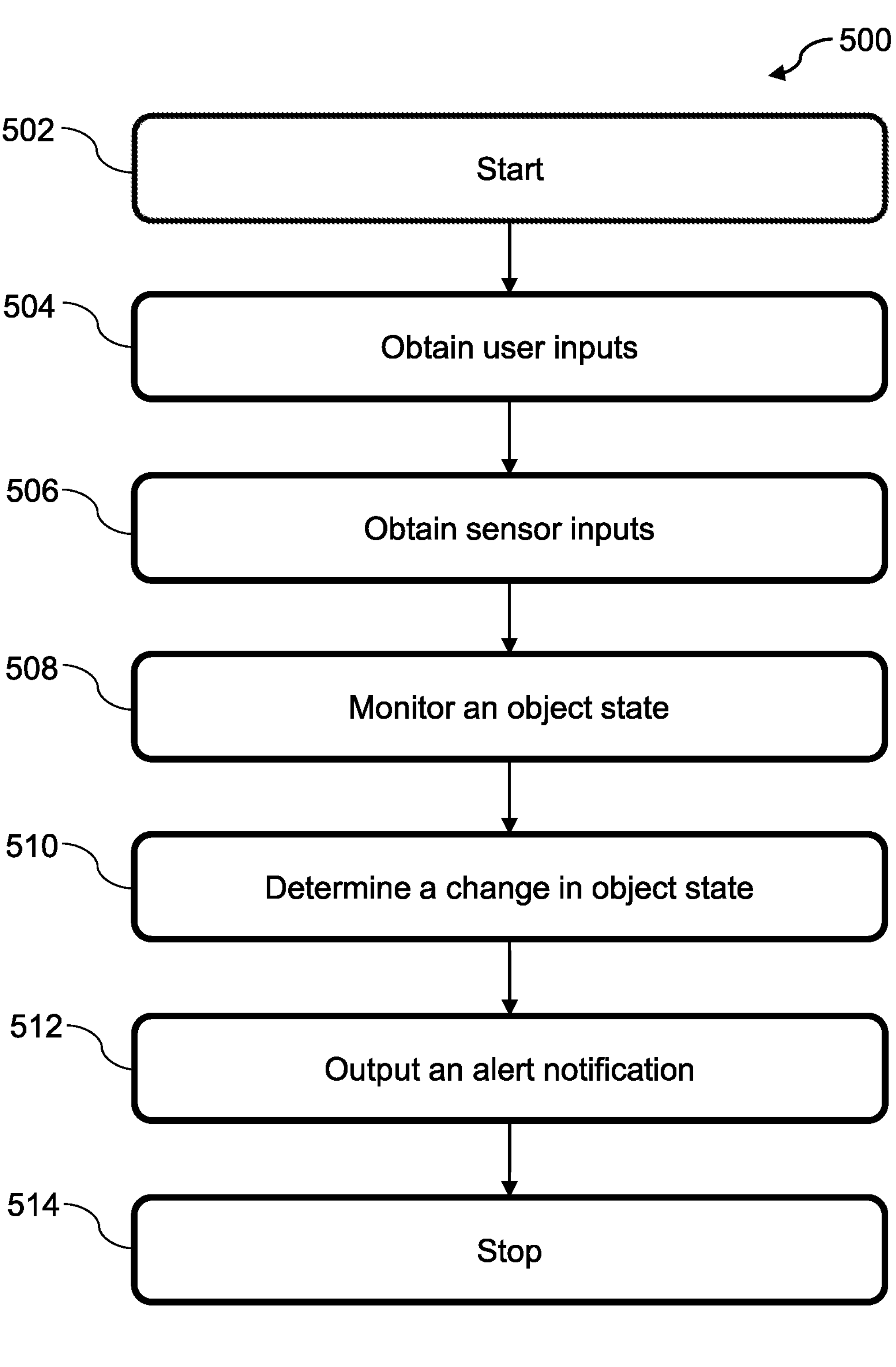
FIG. 5 depicts a flow diagram of a method to monitor an object in accordance with the present disclosure.

FIG. 5 depicts a flow diagram of a method 500 to monitor an object in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 242, the user inputs indicating the object to be monitored in proximity to the vehicle 104. At step 506, the method 500 may include obtaining, by the processor 242, the sensor inputs from the vehicle sensory system 232 responsive to obtaining the user inputs.

At step 508, the method 500 may include monitoring, by the processor 242, the object state based on the sensor inputs. At step 510, the method 500 may include determining, by the processor 242, a change in the object state based on the monitoring. At step 512, the method 500 may include outputting, by the processor 242, the alert notification responsive to determining the change in the object state.

The method 500 may end at step 514.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a sensor unit configured to capture sensor inputs associated with an object external to the vehicle and located at a site in proximity to the vehicle, the object comprising infrastructure or equipment deployed at the site;

a processor communicatively coupled with the sensor unit, wherein the processor is configured to:

obtain user inputs indicating the object to be monitored;

obtain the sensor inputs from the sensor unit responsive to obtaining the user inputs;

monitor an object state based on the sensor inputs;

determine a change in the object state based on the monitoring;

determine, using artificial intelligence or machine learning, that a detected change in the object state represents a condition of concern relative to an initial object state; and output an alert notification responsive to determining the change in the object state.

2. The vehicle of claim 1, wherein the processor obtains the user inputs from a user via a user device or a vehicle Human-Machine Interface (HMI).

3. The vehicle of claim 1, wherein the sensor unit comprises at least one of a camera, a radio detection and ranging (radar) sensor, or a light detection and ranging (lidar) sensor, and wherein the sensor inputs comprise object images.

4. The vehicle of claim 3, wherein the processor is further configured to:

determine an initial object location and an initial object structure associated with the object based on the object images;

determine a change in at least one of the initial object location or the initial object structure based on the monitoring of the object images; and determine the change in the object state responsive to determining that at least one of the initial object location or the initial object structure has changed.

5. The vehicle of claim 1, wherein the sensor unit comprises a thermal camera, and wherein the sensor inputs comprise object thermal images.

6. The vehicle of claim 5, wherein the processor is further configured to:

determine an initial object thermal profile associated with the object based on the object thermal images, wherein the initial object thermal profile is associated with an amount of heat generated by the object;

determine a change in the initial object thermal profile based on the monitoring of the object thermal images; and determine the change in the object state responsive to determining that the initial object thermal profile has changed.

7. The vehicle of claim 1, wherein the processor is further configured to:

obtain an information associated with weather conditions in proximity to the vehicle;

monitor the information associated with weather conditions;

determine a change in weather conditions in proximity to the vehicle based on the monitoring of the information associated with weather conditions; and output the alert notification responsive to determining the change in weather conditions.

8. The vehicle of claim 1, wherein the sensor unit comprises a microphone configured to capture a noise level emanating from the object, and wherein the sensor inputs comprise the noise level.

9. The vehicle of claim 8, wherein the processor is further configured to:

determine an initial noise level associated with the object based on the sensor inputs;

determine a change in the initial noise level based on the monitoring of the noise level; and determine the change in the object state responsive to determining that the initial noise level has changed.

10. The vehicle of claim 1, wherein the processor outputs the alert notification via at least one of a user device, a vehicle Human-Machine Interface (HMI), a vehicle speaker, or a vehicle light.

11. The vehicle of claim 1 further comprising a transceiver, wherein the processor is further configured to transmit the alert notification to a server via the transceiver.

12. The vehicle of claim 1, wherein the user inputs comprise information associated with an error state associated with the object, and wherein the processor is further configured to:

determine that the object state has changed to the error state based on the monitoring; and output the alert notification responsive to determining that the object state has changed to the error state.

13. The vehicle of claim 1, wherein the processor is further configured to:

determine a field of view (FOV) associated with the sensor unit;

determine that the object is not in the FOV; and cause a vehicle movement such that the object is within the FOV, responsive to determining that the object is not in the FOV.

14. The vehicle of claim 1, wherein the processor is further configured to:

determine that the object is powered by a vehicle power source; and disable an energy transfer to the object responsive to determining the change in the object state.

15. A method for monitoring an object in proximity to a vehicle, the method comprising:

obtaining, by a processor, user inputs indicating an object external to the vehicle and located at a site in proximity to the vehicle, the object comprising infrastructure or equipment deployed at the site;

obtaining, by the processor, sensor inputs from a sensor unit responsive to obtaining the user inputs, wherein the sensor unit is configured to capture the sensor inputs associated with the object;

monitoring, by the processor, an object state based on the sensor inputs;

determining, by the processor, a change in the object state based on the monitoring and using artificial intelligence or machine learning, determining that a detected change in the object state represents a condition of concern relative to an initial object state; and outputting, by the processor, an alert notification responsive to determining the change in the object state.

16. The method of claim 15, wherein the sensor unit comprises at least one of a camera, a radio detection and ranging (radar) sensor, or a light detection and ranging (lidar) sensor, and wherein the sensor inputs comprise object images.

17. The method of claim 16 further comprising:

determining an initial object location and an initial object structure associated with the object based on the object images;

determining a change in at least one of the initial object location or the initial object structure based on the monitoring of the object images; and determining the change in the object state responsive to determining that at least one of the initial object location or the initial object structure has changed.

18. The method of claim 15, wherein the sensor unit comprises a thermal camera, and wherein the sensor inputs comprise object thermal images.

19. The method of claim 18 further comprising:

determining an initial object thermal profile associated with the object based on the object thermal images, wherein the initial object thermal profile is associated with an amount of heat generated by the object;

determining a change in the initial object thermal profile based on the monitoring of the object thermal images; and determining the change in the object state responsive to determining that the initial object thermal profile has changed.

20. A non-transitory computer-readable storage medium having instructions stored thereupon which, when executed by a processor, cause the processor to:

obtain user inputs indicating an object external to the vehicle and located at a site in proximity to the vehicle, the object comprising infrastructure or equipment deployed at the site;

obtain sensor inputs from a sensor unit responsive to obtaining the user inputs, wherein the sensor unit is configured to capture the sensor inputs associated with the object;

monitor an object state based on the sensor inputs;

determine a change in the object state based on the monitoring;

determine, using artificial intelligence or machine learning, that a detected change in the object state represents a condition of concern relative to an initial object state; and output an alert notification responsive to determining the change in the object state.

* * * * *